US 9,152,832 B2

Oct. 6, 2015

(12) United States Patent
Royston et al.

(10) Patent No.: US 9,152,832 B2
(45) Date of Patent: Oct. 6, 2015

(54) POSITIONING GUIDANCE FOR INCREASING RELIABILITY OF NEAR-FIELD COMMUNICATIONS

(75) Inventors: Philip Stewart Royston, Newbury (GB); David Cox, Newbury (GB)

(73) Assignee: Broadcom Corporation, Irvine, CA (US)

( * ) Notice: Subject to any disclaimer, the term of this patent is extended or adjusted under 35 U.S.C. 154(b) by 1006 days.

(21) Appl. No.: 13/250,093

(22) Filed: Sep. 30, 2011

(65) Prior Publication Data

US 2013/0084801 A1    Apr. 4, 2013

(51) Int. Cl.
*H04B 5/00* (2006.01)
*G06K 7/015* (2006.01)
*G06K 7/10* (2006.01)

(52) U.S. Cl.
CPC .......... *G06K 7/015* (2013.01); *G06K 7/10118* (2013.01); *G06K 7/10336* (2013.01); *G06K 7/10356* (2013.01)

(58) Field of Classification Search
None
See application file for complete search history.

(56) References Cited

U.S. PATENT DOCUMENTS

| 7,127,214 B2 | 10/2006 | Goldberg |
| 7,986,916 B2 | 7/2011 | Williams |
| 8,169,185 B2 * | 5/2012 | Partovi et al. .................. 320/108 |
| 2001/0041539 A1 | 11/2001 | Juntunen et al. |
| 2006/0017634 A1 * | 1/2006 | Meissner ....................... 343/742 |
| 2007/0026825 A1 * | 2/2007 | Wilson ........................... 455/130 |
| 2007/0197229 A1 * | 8/2007 | Kalliola et al. ............ 455/456.1 |
| 2007/0246546 A1 * | 10/2007 | Yoshida ........................ 235/492 |
| 2008/0068265 A1 * | 3/2008 | Kalliola et al. ............... 342/418 |
| 2009/0011706 A1 * | 1/2009 | Wilson et al. ................ 455/41.1 |
| 2009/0040022 A1 * | 2/2009 | Finkenzeller ................ 340/10.1 |
| 2009/0224045 A1 * | 9/2009 | Toda et al. .................... 235/439 |
| 2009/0308937 A1 * | 12/2009 | Yagi et al. ..................... 235/492 |
| 2010/0094482 A1 * | 4/2010 | Schofield et al. ................ 701/2 |
| 2010/0190436 A1 | 7/2010 | Cook et al. |
| 2010/0291869 A1 * | 11/2010 | Wilson ......................... 455/41.1 |
| 2010/0291871 A1 * | 11/2010 | Butler .......................... 455/41.1 |
| 2011/0300798 A1 * | 12/2011 | Lefley .......................... 455/41.1 |
| 2013/0194078 A1 * | 8/2013 | Bohnenberger et al. ..... 340/10.6 |

OTHER PUBLICATIONS

Office Action mailed on Feb. 5, 2014, in U.S. Appl. No. 13/169,609, filed Jun. 27, 2011 (15 pages).

* cited by examiner

*Primary Examiner* — Zhiyu Lu
(74) *Attorney, Agent, or Firm* — Sterne, Kessler, Goldstein & Fox P.L.L.C.

(57) ABSTRACT

To promote ease of use, as well as a reduction in bit error rates during extended data exchange between a coupled NFC tag/reader pair, signal strength is measured from a plurality of NFC tag antennas each positioned differently with respect to a common reader field, and differences in signal strength are used to determine an optimum positioning of the tag, or tag emulator, with respect to the reader. Alternative embodiments may include signal time of flight for determining orientation of the NFC antennas within the reader field. Information is generated by the tag, or tag emulator, and output by the tag, or tag emulator, such that a user may direct the positioning of the tag, or tag emulator, for improved communication with the reader.

22 Claims, 8 Drawing Sheets

POSITIONING GUIDANCE FOR INCREASING RELIABILITY OF NEAR-FIELD COMMUNICATIONS

FIELD OF THE INVENTION

The present invention relates generally to Near Field Communication (NFC) devices and the operation and application thereof. More particularly, the present invention relates to methods and apparatus for measuring the strength of an NFC reader field in multiple tag antennas and providing guidance for the positioning of an NFC-enabled device having multiple antennas.

BACKGROUND

Advances in semiconductor manufacturing technologies have resulted in dramatically increased circuit packing densities and higher speeds of operation. In turn, these advances have provided designers with the ability to produce many processor and communication functions that were not previously practical. In some instances these functions are combined in a single highly integrated device. In other instances these functions are partitioned into two or more devices or chips.

Advances in digital systems architecture, in combination with the advances in the speed and density of semiconductors, have resulted in the availability of substantial computing power and digital communications networks for relatively low cost. In turn, this has led to a vast installed base of computers and other computational platforms each with the ability to communicate with others.

Given the very large installed base of computational platforms, which includes at least personal computers and smartphones, it is not surprising that new operational paradigms for computational devices have been developed. It is noted that early computational platforms and communication networks served the military/industrial/commercial application space, whereas the vast increases in computational and communication capacities and concurrent cost reductions have resulted in today's ubiquitous platforms and networks serving the personal application space. Indeed, personal applications have gone beyond the deskbound model of interacting with a computer to a model wherein computing and communication hardware are truly personal items, are highly mobile, and are integrated into the fabric of modern living. Consistent with this usage model for powerful personal computational and communication devices, many applications of "on-the-go" computing and communication have been, and are being, developed. One class of such on-the-go applications involves Near Field Communication (NFC) between devices. Applications such as conducting financial transactions with stores, banks, trains, busses, and so on may be facilitated by the near-field coupling of two devices to exchange financial and/or personal information.

It will be appreciated that communications involving financial and/or personal information should be performed with a high degree of reliability. High reliability near-field communication is served by optimally aligning the antenna of an NFC tag, or tag emulator, with a reader field.

What is needed are methods, apparatuses and systems for measuring the received signal strength in multiple tag antennas disposed in an NFC tag, or tag emulator, during a near-field communication, and providing guidance for positioning the tag, or tag emulator, with respect to a reader field in connection with improving and maintaining a reliable communications connection.

BRIEF DESCRIPTION OF THE DRAWINGS

Embodiments of the invention are described with reference to the accompanying drawings. In the drawings, like reference numbers indicate identical or functionally similar elements. Additionally, the left most digit(s) of a reference number identifies the drawing in which the reference number first appears.

DETAILED DESCRIPTION

Figure 1:
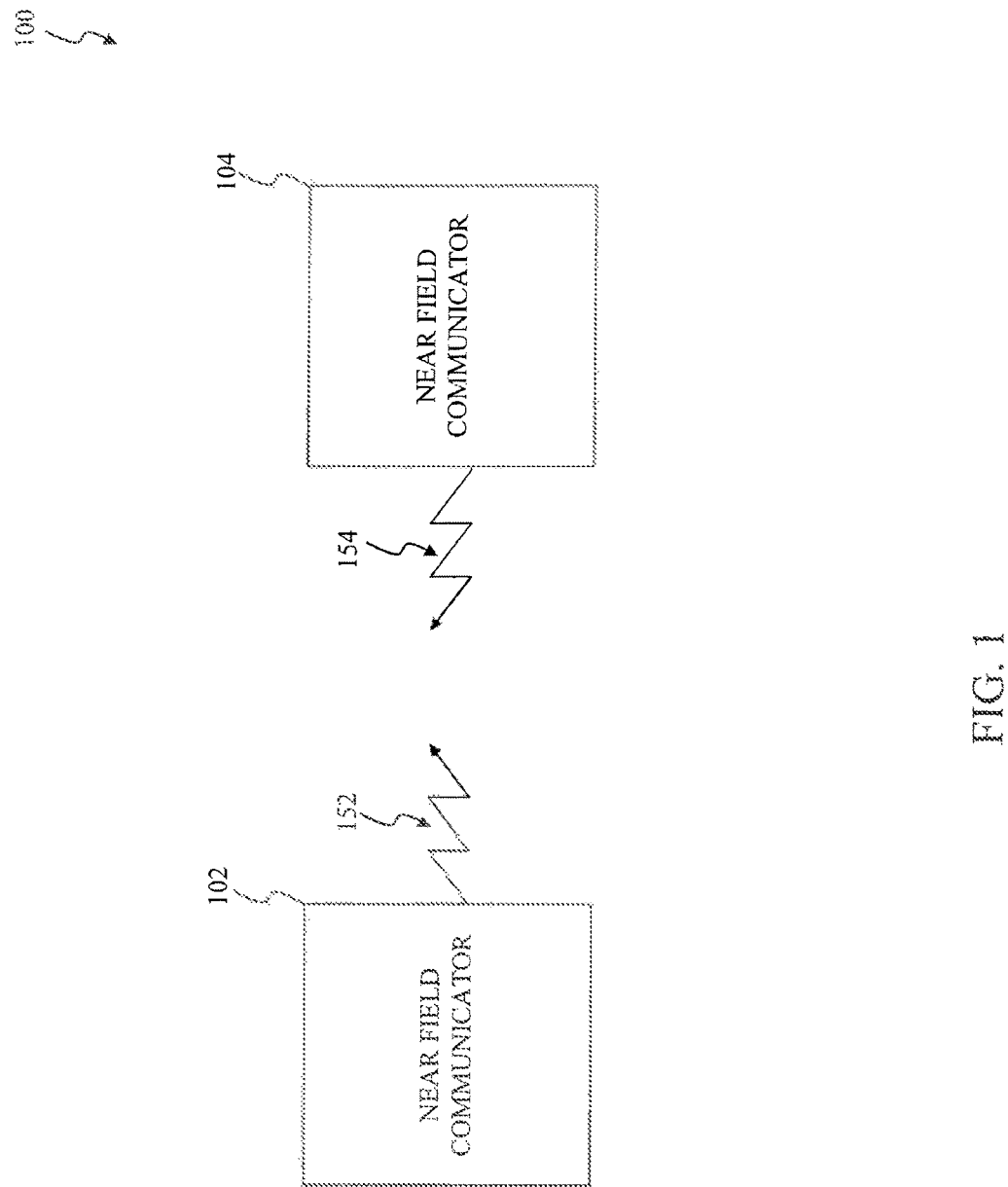
FIG. 1 is a block diagram illustrating a near field communication (NFC) environment in accordance with the present invention.

As noted above, many applications of near-field communication involve transactions where the tolerance for unreliable data transfer is low. Such applications include, but are not limited to, banking transactions, retail payments, and operating a contactless gate or similar means of accessing public transportation.

In a contactless, proximity-based, communication arrangement such as near-field communication, a small change in the distance between a tag, or tag emulator, and a tag reader, or in the orientation of their antennas can act to reduce signal strength and in turn the reliability of the communication.

Various embodiments of the present invention provide, directly or indirectly, information from which a user can adjust the relative positions of the tag/reader pair to improve the strength of the coupling therebetween, and thus improve the communicative interaction between the tag/reader pair. In other words, by aligning the tag antenna in the reader field to get the best "connection", data can more reliably be transferred between the devices. In some embodiments, alignment means centering an NFC antenna array with respect to the reader field. In other embodiments alignment means positioning the NFC antenna array to obtain a stronger coupling between the tag/reader pair.

The following Detailed Description refers to accompanying drawings to illustrate exemplary embodiments consistent with the invention. References in the Detailed Description to "one exemplary embodiment," "an illustrative embodiment", "an exemplary embodiment," and so on, indicate that the exemplary embodiment described may include a particular feature, structure, or characteristic, but every exemplary embodiment may not necessarily include the particular feature, structure, or characteristic. Moreover, such phrases are not necessarily referring to the same exemplary embodiment. Further, when a particular feature, structure, or characteristic is described in connection with an exemplary embodiment, it is within the knowledge of those skilled in the relevant art(s) to affect such feature, structure, or characteristic in connection with other exemplary embodiments whether or not explicitly described.

The exemplary embodiments described herein are provided for illustrative purposes, and are not limiting. Other exemplary embodiments are possible, and modifications may be made to the exemplary embodiments within the spirit and scope of the invention. Therefore, the Detailed Description is not meant to limit the invention. Rather, the scope of the invention is defined only in accordance with the subjoined claims and their equivalents.

The following Detailed Description of the exemplary embodiments will so fully reveal the general nature of the invention that others can, by applying knowledge of those skilled in relevant art(s), readily modify and/or adapt for various applications such exemplary embodiments, without undue experimentation, without departing from the spirit and scope of the invention. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

Although the description of the present invention is provided in terms of NFC, those skilled in the relevant art(s) will recognize that the present invention may be applicable to other communications that use the near field and/or the far field without departing from the spirit and scope of the present invention. For example, although the present invention is to be described using NFC capable communication devices, those skilled in the relevant art(s) will recognize that functions of these NFC capable communication devices may be applicable to other communications devices that use the hear field and/or the far field without departing from the spirit and scope of the present invention.

TERMINOLOGY

As used herein, the expression "Near-field communicator" refers to a product that includes at least the resources to provide NFC tag and NFC tag reader functionality. Such products may sometimes be referred to as NFC-enabled devices.

Operating system refers generally to the software that schedules tasks, allocates storage, handles the interface to peripheral hardware and presents a default interface to a user when no application program is running.

As used herein, the term "transponder" refers to circuitry including a transmitter and a receiver such that a transponder may be used to transmit information responsive to receiving a query or other form of interrogation signal or communication. It is noted that a transponder may be implemented without any requirement of integration on a single die, and the present invention is not limited to any particular partitioning of transponder functionality amongst any particular number of components. In typical embodiments, transponders are formed on a single die.

The terms, chip, die, integrated circuit, semiconductor device, and microelectronic device, are often used interchangeably in the field of electronics. The present invention is applicable to all the above as these terms are generally understood in the field.

With respect to chips, it is common that power, ground, and various signals may be coupled between them and other circuit elements via physical, electrically conductive connections. Such a point of connection may be referred to as an input, output, input/output (I/O), terminal, line, pin, pad, port, interface, or similar variants and combinations. Although connections between and amongst chips are commonly made by way of electrical conductors, those skilled in the art will appreciate that chips and other circuit elements may alternatively be coupled by way of optical, mechanical, magnetic, electrostatic, and electromagnetic interfaces.

The term "smartcard" refers to a physical substrate, such as a credit card sized piece of plastic, having an integrated circuit embedded therein. Typically, smartcards are used for financial transactions or secure access to locked facilities. An active smartcard is one that includes an embedded power supply such as a battery. A passive smartcard is one that requires power to be supplied from an external source. In some instances, the external source is an energization field from which the passive smartcard harvests the energy needed to carry out its desired function.

The terms "nominal" and "nominally" refer to the physically achieved embodiment of a specified value or parameter within the manufacturing tolerances regularly accepted in a particular industrial practice area.

An Illustrative Near Field Communications Environment

FIG. 1 is a block diagram showing an NFC environment in accordance with the present invention. An NFC environment 100 provides wireless communication of information among a first NFC device 102 and a second NFC device 104 that are sufficiently proximate to each other. The information may include one or more commands to be executed by first NFC device 102 and/or second NFC device 104, data from one or more data storage devices that is to be transferred to first NFC device 102 and/or second NFC device 104, or any combination thereof. The data storage devices may include one or more contactless transponders, one or more contactless tags, one or more contactless smartcards, any other machine-readable media that will be apparent to those skilled in the relevant art(s) without departing from the spirit and scope of the invention, or any combination thereof. Other machine-readable media may include non-transitory storage media, such as but not limited to, volatile memory, e.g., random access memory (RAM); non-volatile memory, e.g., read only memory (ROM), flash memory, magnetic disk storage media, and optical storage media. Still other machine readable media may include electrical, optical, acoustical or other forms of propagated signals such as carrier waves, infrared signals, and digital signals, to provide some examples.

As mentioned above, improvements in manufacturing technologies and digital architecture have resulted in a number of products and product categories that were not previously possible or practical to implement. The emerging developments in the area of Near Field Communication (NFC) circuits, systems and applications is making new products and product categories possible. Products incorporating Near-Field Communication capabilities are sometimes referred to as NFC-enabled. For example, mobile phones, smart cards, key fobs, secure access cards, tablet computers, or other electronic products that include NFC capabilities are referred to as NFC-enabled. Near-field communication allows data to be communicated from a first NFC-enabled device to a second NFC-enabled device over short distances. Although a strict definition for the range of short distances is not agreed upon in the field, short range for NFC usually is thought of as being less than 4 cm, or within one wavelength of the selected communication frequency, typically 13.56 MHz.

Typical NFC arrangements involve a pair of devices in which a first device acts as a "tag" to respond to a communication and a second device within a near-field coupling distance of the first device acts as a "reader" to initiate the communication. In various embodiments of the present invention the first device may be equipped with the circuitry for acting as both a tag and a reader, commonly referred to as a communicator. Electronic products that include NFC tag circuitry along with circuitry for other functionality may be referred to as tag emulators, or to have the capability of operating in "tag emulation mode". Similarly, electronic products that include NFC reader circuitry along with circuitry for other functionality may be referred to as reader emulators, or to have the capability of operating in "reader emulation mode".

NFC-enabled devices and applications have utility in at least consumer electronics and industrial products.

In connection with the following illustrative embodiments, it is noted that any reference to a computational platform is intended to include similar computational devices and computers regardless of their form factor or input/output configuration. By way of example, and not limitation, a smartphone is a computational platform.

Methods and apparatus in accordance with the present invention determine whether an NFC-enabled device with multiple antennas is properly aligned within a reader field, and provide one or more user-perceivable outputs that can be used to properly align the NFC-enabled device within the reader field. More particularly, such methods and apparatus provide for NFC-enabled devices that determine the signal strength received from an NFC reader's field, in each of a plurality of antennas, which have a known spaced apart relationship with each other. Based on the differences measured, or otherwise determined, in the signal strength in each of the antennas, the NFC-enabled device provides guidance to a user in re-positioning or re-orienting the NFC-enabled device to improve the communicative interaction with the reader.

It is noted that any parameter that allows the NFC-enabled device to determine whether it should be re-positioned or re-oriented to improve communicative interaction with the reader device may be measured or otherwise obtained for use with the present invention. Various illustrative embodiments describe determining the magnitude of the currents induced in the antennas by a coupled reader field as a measure of the strength of the coupling between the tag and the reader. Similarly, any means of determining field strength, field coupling, signal strength, antenna voltage, and so on, from which antenna alignment for improved communicative interaction between tag and reader can be achieved may be used in various embodiments of the present invention.

Although typical embodiments of the present invention make measurements at each of the antennas in an array of NFC antennas, it is noted that, in alternative embodiments, the antenna signals can be passed to a demodulator where signals indicative of the strength of the received signals may also be generated. For example, in some alternative embodiments, wherein the NFC-enabled device is operating in tag emulation mode, in-phase (I) and quadrature (Q) components of the received signal in the demodulator of the reader receiver are measured, and one or more outputs are generated, based at least in part on the measured I and Q. These one or more outputs are typically designed to be user-perceivable. Such user-perceivable outputs typically visual or graphical, are suitable for directing a user in connection with how to spatially orient the NFC-enabled device to improve the received signal strength, or the communicative interaction with the reader. Since embodiments of the present invention have information from a plurality of spaced apart antennas, the antennas having a known spatial relationship with each other, an optimal, or at least improved, alignment between a tag/reader pair can be calculated from the differences between the signal strength at each of the antenna locations.

Figure 2:
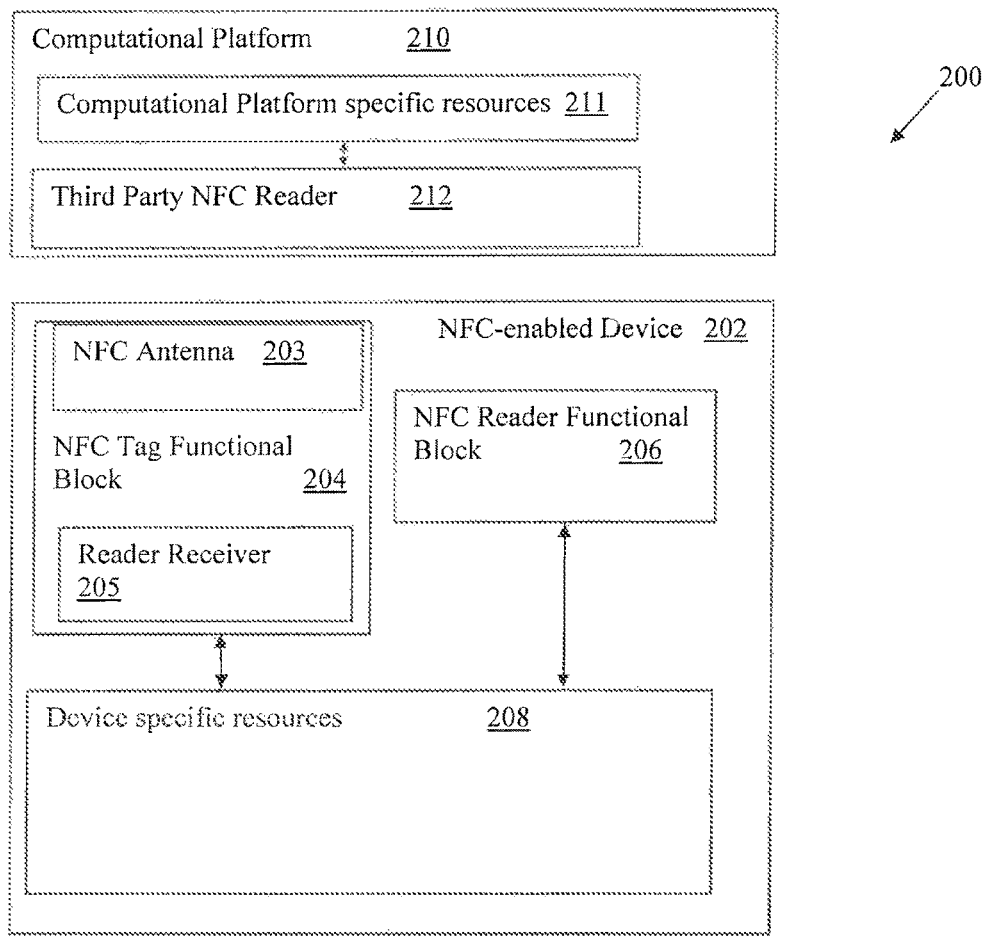
FIG. 2 is a high-level block diagram illustrating an NFC-enabled device having both tag and reader functionality, with the NFC-enabled device disposed adjacent to a computational platform having NFC tag reader functionality.

FIG. 2 shows a high-level block diagram of a near-field communication arrangement 200 that includes a NFC-enabled device 202 having both tag 204 and reader 206 functional blocks, the NFC-enabled device 202 being disposed adjacent to a second NFC-enabled device such as a computational platform 210 having NFC tag reader 212 functionality. The circuitry block that implements NFC tag functional block 204 includes an NFC antenna array 203 and a reader receiver 205. It is noted that NFC antenna array 203 contains a plurality of NFC antennas. Typically NFC antenna array 203 contains three or more NFC antennas. In typical embodiments, each of the antennas in NFC antenna array 203 has the same shape, dimensions, and material composition. Further, in typical embodiments the layout of the antennas is symmetrical. The symmetry of layout, as well as shape, dimension, and material composition simplifies calculations for determining how far and in what direction to move the NFC-enabled device for improved communicative interaction with the reader field. Calculations are simplified in this way because the currents in each of the antennas is then related to field strength at that antenna's location and not to its shape, dimensions, material composition, or non-symmetrical layout. It will be appreciated that the performance of the individual antennas in the NFC antenna array 203 may also be affected by nearby components within the NFC-enabled device, and their effects should be taken into account when giving weight to the induced currents in each antenna of the array.

NFC-enabled device 202 further includes device specific resources 208. In typical embodiments, device specific resources 208 are coupled to both the NFC tag functional block 204 and the NFC reader functional block 206.

Since almost any electronic product may be provided with NFC capabilities, NFC-enabled devices may include, but are not limited to, computational platforms, smart cards, smart phones, mobile phones, secure access cards, bus and train payment cards, key fobs, utility meters, sensors, and so on. Device specific resources 208 may include a wide variety of hardware, and may further include software (i.e., stored program code). Stored program code, when executed, may implement an operating system and/or application programs for the NFC-enabled device 202. Stored program code is typically stored in memory devices disposed within NFC-enabled device 202. Such memory devices may be implemented with any suitable type of memory circuitry. Those skilled in the art will recognize that memory may be implemented as addressable regions within a single memory chip, or addressable regions of several different memory chips. In typical embodiments, at least a portion of the memory includes non-volatile memories. Non-volatile memories have the characteristic of retaining the contents stored therein even when no power is applied to those memories. There are a number of types of non-volatile memory including, but not limited to, flash memory, Read Only Memory (ROM), one-time programmable memory, fuse programmable memory, anti-fuse programmable memory, laser programmable memory, electrically alterable read only memory, and so on. In typical embodiments, at least a portion of the memory in the NFC-enabled device is a non-volatile memory that can be repeatedly written to, as well as read from.

In some embodiments, device specific resources 208 include one or more programmable configuration registers. By way of example, and not limitation, if NFC-enabled device 202 is a smart phone, then device specific resources 208 may include, among other resources, one or more cellular telephone radios, a Bluetooth radio, a GPS radio, a Wi-Fi radio, a microprocessor, a graphics processor, volatile and non-volatile memory, stored program code, one or more accelerometers and/or gyroscopes, one or more digital cameras, a display screen, a display screen controller, audio inputs and outputs, and so on. In typical embodiments, NFC tag functional block 204 and NFC reader functional block 206 are communicatively coupled to one or more of the device specific resources 208.

Still referring to FIG. 2, near-field communication arrangement 200 further includes a computational platform 210. Computational platform 210 includes computational platform specific resources 211 and an NFC reader 212. It is noted that in various embodiments, NFC tag reader 212 may be a reader/writer. An NFC reader/writer is a functional block that, in addition to receiving data from an NFC tag, or tag emulator, can also write data to the tag, or tag emulator. For the sake of convenience, references to tag are generally meant to include tag emulator.

It will be appreciated that NFC-enabled devices in accordance with the present invention may be active or passive. Active devices have access to a power supply such as a battery or other DC power supply (e.g., an AC adaptor). Passive devices are those which need to harvest energy from, for example, an external energization field.

As noted above, in accordance with the present invention, guidance can be provided to NFC users by provision of a visual indication of the relative position of the user's device and a target device. By using three or more antennas, the relative signal strength at the different antennas can be used to calculate, or derive, the relative position of a target device in relation to the user's device. For instance if the signal strengths established at all four antennas of a four-antenna array are the same, then the antenna array is most likely centrally located with respect to a reader field, unless the signal strength is so low that the tag is a long way from all of them. In typical embodiments the problem of very low signal strength is dealt with by setting a threshold value, comparing the received signal strength to the threshold value, disabling the location calculations until the signal strength reaches or exceeds the threshold value.

Figure 3:
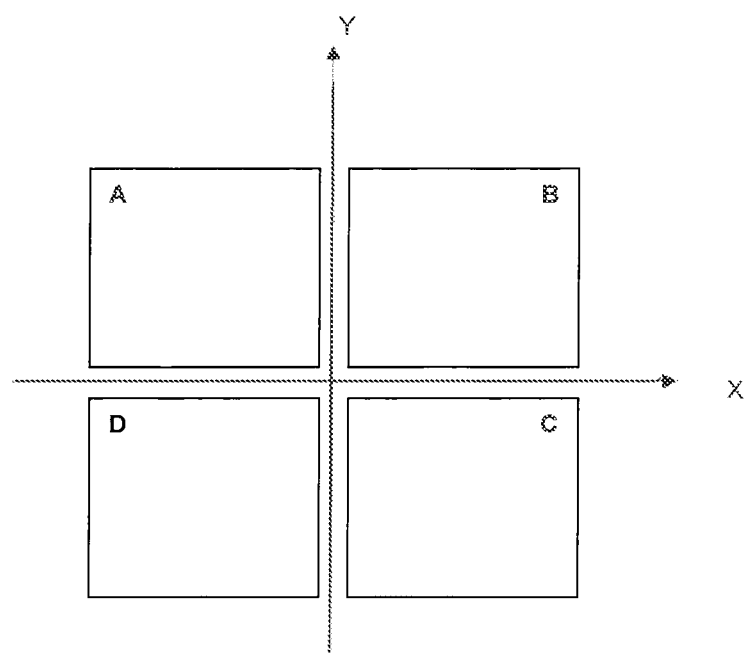
FIG. 3 is a schematic block diagram of an illustrative NFC antenna array in accordance with the present invention.

Referring to FIG. 3, a symmetrical four-antenna NFC antenna array is shown. The individual antennas are labeled A, B, C, and D. In this embodiment antennas A, B, C, and D are symmetrical with respect to the x and y axes shown in the figure. Typically the individual antennas nominally have the same shapes, same dimensions, are made from the same materials, and are laid out symmetrically. Those skilled in the art and having the benefit of this disclosure will recognize that the present invention is not limited to antennas that are symmetrically laid out and made of the same materials, but this does make calculations easier. In this illustrative embodiment of the present invention, the signal strengths measured at each antenna of the antenna array are used to calculate the relative x, y position of the target antenna (in this case the reader antenna):

Let (0,0) be the x, y position at the middle of the four-antenna array.

$Y \text{ position} = \text{Const}((A+B)-(D+C))$ $X \text{ position} = \text{Const}((A+D)-(B+C))$ Const refers to a constant factor, and the constant is a factor of the efficiency and size of the four antennas and is typically derived experimentally, without undue experimentation. It will be appreciated that the set of x, y coordinates define a plane. Because the antennas of the NFC antenna array are typically coplanar, the x, y coordinates here refer to the plane of the NFC antenna array.

Figure 4:
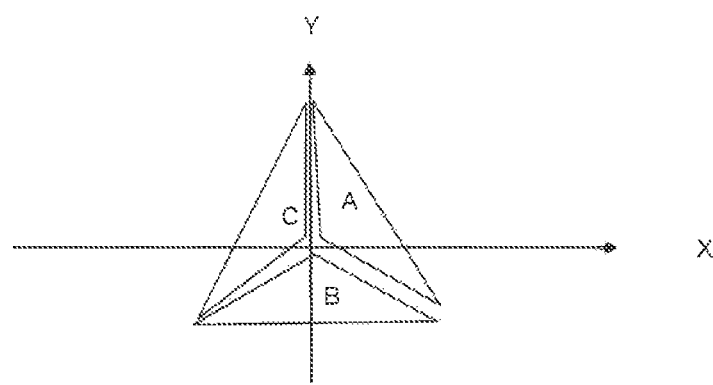
FIG. 4 is a schematic block diagram of an alternative illustrative NFC antenna array in accordance with the present invention.

Referring to FIG. 4, an alternative embodiment using a three-antenna array is shown. Using the signal strengths measured at each of the three antennas, the relative x, y position of the target antenna can be calculated:

Let (0,0) be the x, y position at the middle of the three-antenna array.

$Y \text{ position} = \text{Const}(((A+C)/2)-B)$ $X \text{ position} = \text{Const}(A-C)$ The constant will again be a factor of the efficiency and size of the three antennas and can be derived experimentally, without undue experimentation.

An alternative method uses signal flight time. A signal flight time calculation may also be used where each of the antennas polls the target and the response delay time is recorded between the command sent and the reception of the first response edge (load modulation or carrier modulation). This time of flight should be recording with an accuracy on the order of 1 ps, and the recorded times of flight are preferably averaged over several transitions to overcome jitter in the system.

For a four-antenna array:

$Y \text{ position (meters)} = c^* f((TA+TB)/2 - (TD+TC)/2)$ $X \text{ position (meters)} = c^* f((TA+TD)/2 - (TB+TC)/2)$ Where c is the speed of light in air.

The foregoing relationships can be used by the computational resources disposed on the NFC-enabled device to calculate the actual distance in meters between the center of the antenna array and the target antenna. It is noted that in this context, "disposed on", also includes disposed in, embedded within, incorporated into the physical structure of, or similar arrangements. For the measure to be useful and intuitive to a user, just the lateral distance should be calculated. The z distance will be very small, however a small correction may be needed to take this average effect into account as the distance is not known. An assumption of an average NFC range can be used such as 1 cm or 0.01 m. In this case:

Corrected $Y = \text{sqrt}(Y^2 - 0.01^2)$

Corrected $X = \text{sqrt}(X^2 - 0.01^2)$

The z value may also be determined using the signal strength.

Figure 5:
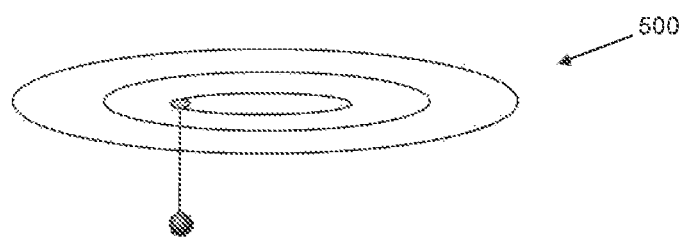
FIG. 5 is an illustration of a graphical user interface suitable for directing a user to position an NFC device in a reader field for improved communicative interaction.

As shown in FIG. 5, the relative position of the tag and reader can be displayed graphically such as using a bulls-eye or grid graphic with a cursor or pointer indicating the relative position of the target NFC device and a marker indicating the center of the antenna array of the mobile device.

The z position may be indicated, for example, by either making the cursor larger for close proximity or smaller for longer distance between the target and the mobile device antenna array. The grid or target may be shown as a third angle projection with the position of the target shown in 3D. The x, y position may be clarified by adding a perpendicular tail to the cursor joining the cursor to a shadow base plane of the grid or target plane.

In one illustrative embodiment, an NFC communicator, operating in tag emulation mode, is disposed within the near-field of an NFC tag reader. The present invention is not limited in regard to whether the NFC communicator, the NFC tag reader, or both are moved so that the communicator is within the near-field of the tag reader. A field detector of the communicator detects the presence of the reader's near-field and wakes up the rest of the communicator. Firmware within the communicator is executed by one or more computational resources disposed therein to exercise control over its further operations. A reader receiver circuit within the communicator performs well-known receiver functions including, but not limited to, converting from analog to digital, recovering I and Q signals, demodulating the signal from the tag reader and processing the information extracted from the tag reader's signal in accordance with the particular requirements of this communicator. The signal strength meter function of the present invention, based on the levels of the I and Q signals provides drive signals to a visual indicator of received signal strength. In this illustrative embodiment, the visual indicator is a series of LEDs activated to form a bar graph indicating the relative strength of the received signal. Based on such human perceivable output, a user may adjust the position or orientation of the communicator to achieve a stronger signal.

It is noted that visual output may take any suitable form. In various embodiments, the visual output of the signal strength meter may take the form of a dial, or numerical digits, or alphabetic characters, or colored lights, or even an electro-mechanical meter movement. In still other embodiments, the human perceivable output is an audio output, where the sound generated is indicative of signal strength. Alternatively, the I and Q signals provides drive signals to an acoustic indicator of received signal strength. In this illustrative embodiment, the acoustic represents a sound generating device indicating the relative strength of the received signal. For example, the sound generating device may generate a tone or vibrate indicating a low strength of the received signal. In still further embodiments, the information regarding received signal strength is transmitted via one or more communication resources of the communicator to another device. By way of example, and not limitation, the communicator may generate audio data based on the signal strength information and send that audio data to a Bluetooth earphone paired with the communicator.

In one embodiment, when operating in tag emulation mode, the signal strength from the reader as seen by a particular one of the plurality of antennas in an array of antennas can be determined by measuring the averaged DC current induced in that tag emulator antenna from the reader field when a tag shunt regulator is operating. Up to the point where the tag shunt regulator starts to operate, the peak to peak voltage across the coil terminals can be used to represent the field strength. In other words, a method in accordance with the present invention creates a measurement of field coupling strength by using the peak voltage across the tag emulator antennas when this voltage is below the shunt regulator threshold, and uses a measure of the current in the antenna when the tag shunt regulator is shunting. Measuring the current in this way essentially allows the shunt regulator's feedback signal to be "reused". Such an embodiment advantageously provides a low-cost tag emulation only NFC device (which may still be part of a larger host).

Figure 6:
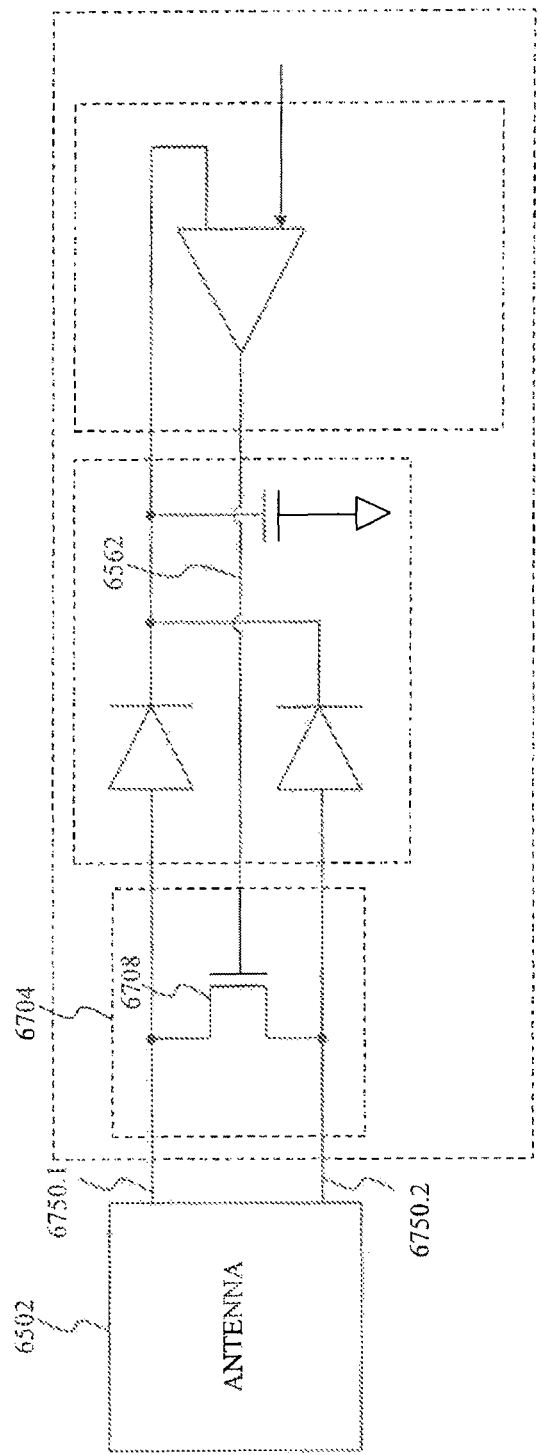
FIG. 6 is a schematic diagram of a tag emulator antenna shunt regulator circuit.

A simplified schematic diagram of an exemplary tag shunt regulator circuit is shown FIG. 6. A tag emulator antenna 6502 provides differential signal pair 6750.1 and 6750.2, A regulator module 6704 adjusts the power level of the differential recovered communications signal 6750.1, 6750.2 in response to the regulation control signal 6562. The regulator module 6704 includes a shunt transistor 6708. The shunt transistor 6708 represents a controllable impedance that shunts at least some of the recovered communications signal 6750.1 with at least some of the differential recovered communications signal 6750.2 when the regulation control signal 6562 is greater than or equal to its threshold voltage. The amount of the differential recovered communications signal 6750.1, 6750.2 that is shunted together is related to a magnitude of the regulation control signal 6562. The shunt transistor 6708 will shunt more of the differential recovered communications signal 6750.1, 6750.2 together for a larger regulation control signal 6562.

Figure 7:
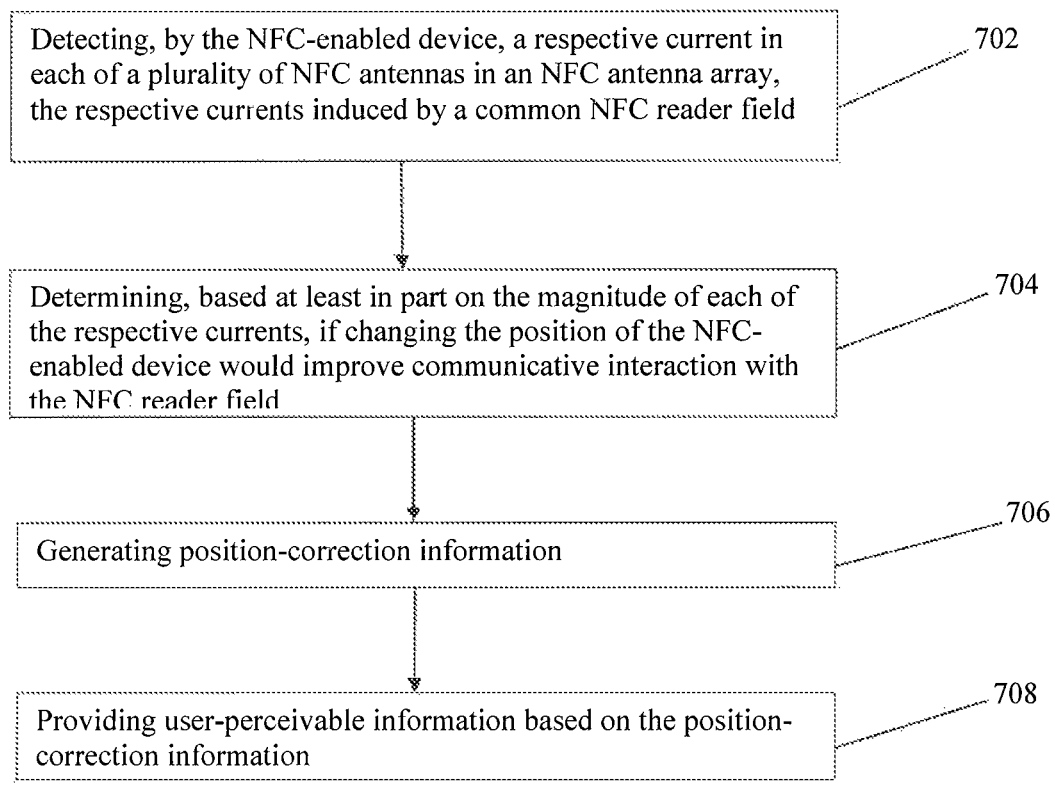
FIG. 7 is a flow diagram of a method of operating an NFC-enabled device in accordance with the present invention.

In the illustrative embodiment shown in FIG. 7, a method of operating an NFC-enabled device, includes (a) detecting 702, by the NFC-enabled device, a respective current in each of a plurality of NFC antennas in an NFC antenna array, the respective currents induced by a common NFC reader field; and (b) determining 704, based at least in part on the magnitude of each of the respective currents, if changing the position of the NFC-enabled device would improve communicative interaction with the NFC reader field; wherein the NFC antenna array is disposed on the NFC-enabled device. It is noted that in this context, "disposed on", also includes disposed in, embedded within, incorporated into the physical structure of, or similar arrangements. This method may further include (c) generating 706, if the determination of (b) is affirmative, position-correction information. This method may further include (d) providing 708 user-perceivable information based on the position-correction information. This method may further include (e) repeating steps (a) through (d). In various embodiments each of the plurality of NFC antennas nominally has the same shape and dimensions, and/or nominally has the same material composition.

In various embodiments, the position-correction information includes information representing how far the center of the NFC antenna array should be moved in an x direction and a y direction to align the NFC antenna array to the reader field. It is noted that the amount to move in the x or y direction may be zero. Additionally, the user-perceivable information may include a visual display representing the distance and direction to move the NFC-enabled device in order to align the NFC antenna array with the reader field. With respect to aligning the NFC antenna array, in some embodiments aligning the NFC antenna array with the reader field includes centering the NFC antenna array within the reader field, whereas in other embodiments it may include positioning the NFC antenna array within the reader field to obtain an increased level of coupling between the reader field and the NFC antenna array.

In another illustrative embodiment of the present invention, a method of operating an NFC tag emulator, includes coupling to an NFC reader field at each of a plurality of NFC antennas, each of the plurality of NFC antennas disposed on the tag emulator; determining, by the tag emulator, the relative coupling strength at each of the plurality of antennas based at least in part on the magnitude of a current induced in each of the plurality of antennas by the coupled NFC reader field; generating, by the tag emulator, position-correction information based at least in part on the relative coupling strength at each of the plurality of antennas; wherein each of the plurality of antennas has a known spaced apart relationship to the other antennas of the plurality of antennas. It is noted that in this context, "disposed on", also includes disposed in, embedded within, incorporated into the physical structure of, or similar arrangements.

Figure 8:
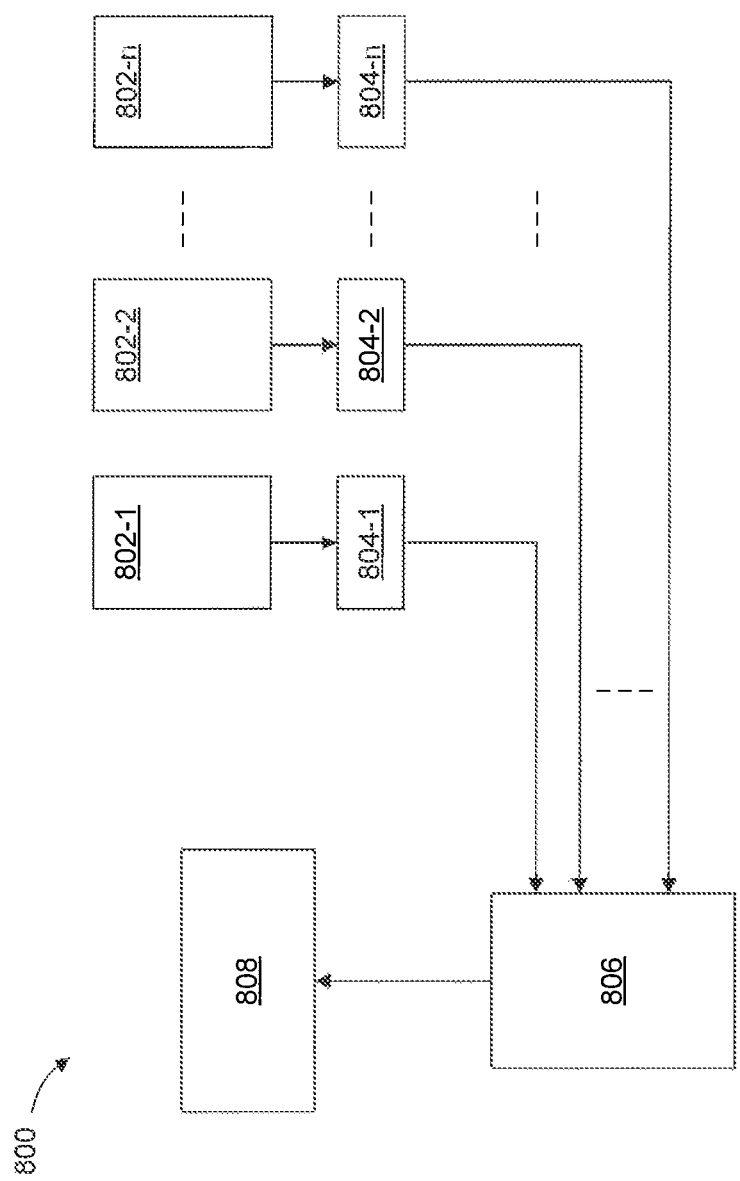
FIG. 8 is a schematic block diagram of a portion of an NFC-enabled device with multiple antennas, field strength detectors, a computational resource and a display.

In the illustrative embodiment shown in FIG. 8, an NFC-enabled device 800, includes an NFC antenna array 802 having at least three antennas; a plurality of field strength detector circuits 804, one field strength detector circuit coupled to each of the at the least three antennas, the field strength detector circuits operable to provide one or more signals indicative of the strength of the received signal at the antenna to which it is coupled; a computational resource 806 coupled to each of the plurality of field strength detectors, the computational resource operable, based at least in part on the signals indicative of the strength of the received signal at each antenna of the NFC antenna array, to determine whether the NFC-enabled device should be repositioned for improved communicative interaction with a reader device; and a visual display device 808 coupled to the computational resource; wherein the visual display, under control of the computational resource, provides a user-perceivable output indicating the distance and direction for repositioning the NFC-enabled device.

In one illustrative method in accordance with the present invention, aligning a pair of NFC-enabled devices to each other, at least one of the NFC-enabled devices having a plurality of antennas, includes transmitting from each of the plurality of antennas of a first one of the pair of NFC-enabled devices, a corresponding command; receiving a response to each of the commands; measuring the response delay time of each of the responses; recording each response delay time such that each response delay time is associated with the antenna from which the respective command was transmitted; and determining the distance of each of the antennas from the source of the response based on the response delay time associated with each antenna; wherein the response delay time is the amount of time between the command sent and the reception of a first response edge. It is noted that the first response edge can be one of a carrier modulation or a load modulation.

In another illustrative method in accordance with the present invention, aligning a pair of NFC-enabled devices to each other, at least one of the NFC-enabled devices having a plurality of antennas, includes transmitting a plurality of commands from each of the plurality of antennas of a first one of the pair of NFC-enabled devices; receiving a response to each of the commands; measuring the response delay time of each of the responses; recording each response delay time such that each response delay time is associated with the antenna from which the respective command was transmitted; averaging, for each of the plurality of antennas, the associated plurality of response delay times; and determining the distance of each of the antennas from the source of the response based on the average response delay time associated with each antenna; wherein the response delay time is the amount of time between the command sent and the reception of a first response edge.

Various embodiments of the present invention advantageously enables users of NFC devices unfamiliar with the antenna locations within either their or the target device to make more reliable transactions, particularly for longer transactions where bit error rate is more critical.

CONCLUSION

It is to be appreciated that the Detailed Description section, and not the Abstract of the Disclosure, is intended to be used to interpret the claims. The Abstract of the Disclosure may set forth one or more, but not all, exemplary embodiments of the invention, and thus, is not intended to limit the invention and the subjoined claims in any way.

The invention has been described above with the aid of functional building blocks illustrating the implementation of specified functions and relationships thereof. The boundaries of these functional building, blocks have been arbitrarily defined herein for the convenience of the description. Alternate boundaries may be defined so long as the specified functions and relationships thereof are appropriately performed.

It will be apparent to those skilled in the relevant art(s) that various changes in form and detail can be made therein without departing from the spirit and scope of the invention. Thus the invention should not be limited by any of the above-described exemplary embodiments, but should be defined only in accordance with the subjoined claims and their equivalents.

What is claimed is:

1. A method of operating an NFC-enabled device, comprising:
detecting, by the NFC-enabled device, a respective current in each of a plurality of NFC antennas having antenna terminals, in an NFC antenna array, by measuring an averaged DC current when a shunt regulator is operating and measuring a peak-to-peak voltage across the antenna terminals when the peak-to-peak voltage is less than a threshold voltage of the shunt regulator, the respective currents induced by a common NFC reader field; and
determining, based at least in part on the magnitude of each of the respective currents, if changing a position of the NFC-enabled device would improve communicative interaction with the NFC reader field;
wherein the NFC antenna array is disposed on the NFC-enabled device.

2. The method of claim 1, further comprising:
generating position-correction information if changing the position of the NFC-enabled device would improve communicative interaction with the NFC reader field.

3. The method of claim 2, further comprising:
providing user-perceivable information based on the position-correction information.

4. The method of claim 3, further comprising:
repeating:
detecting, by the NFC-enabled device, the respective current in each of the plurality of NFC antennas in the NFC antenna array, the respective currents induced by the common NFC reader field;
determining, based at least in part on the magnitude of each of the respective currents, if changing the position of the NFC-enabled device would improve communicative interaction with the NFC reader field;
generating positive correction information if changing the position of the NFC-enabled device would improve communicative interaction with the NFC reader field; and
providing user-perceivable information based on the position-correction information.

5. The method of claim 4, wherein each of the plurality of NFC antennas nominally has the same shape and dimensions.

6. The method of claim 4, wherein each of the plurality of NFC antennas nominally has the same material composition.

7. The method of claim 4, wherein the position-correction information comprises information representing how far the center of the NFC antenna array should be moved in an x direction and a y direction to align the NFC antenna array to the reader field.

8. The method of claim 3, wherein the user-perceivable information comprises a visual display representing the distance and direction to move the NFC-enabled device in order to align the NFC antenna array with the reader field.

9. The method of claim 8, wherein aligning the NFC antenna array with the reader field comprises centering the NFC antenna array within the reader field.

10. The method of claim 8, wherein aligning the NFC antenna array with the reader field comprises positioning the NFC antenna array within the reader field to obtain an increased level of coupling between the reader field and the NFC antenna array.

11. A method of operating an NFC tag emulator, comprising:
coupling to an NFC reader field at each of a plurality of NFC antennas having terminals, each of the plurality of NFC antennas disposed on the tag emulator;
determining, by the tag emulator, a relative coupling strength at each of the plurality of NFC antennas by measuring an averaged DC current when a shunt regulator is operating and measuring a peak-to-peak voltage across the antenna terminals when the peak-to-peak voltage is less than a threshold voltage of the shunt regulator; and
generating, by the tag emulator, position-correction information based at least in part on the relative coupling strength at each of the plurality of antennas;
wherein each of the plurality of NFC antennas has a known spaced-apart relationship to the other NFC antennas of the plurality of NFC antennas.

12. The method of claim 11, wherein each of the plurality of NFC antennas nominally has the same physical dimensions.

13. The method of claim 11, wherein at least one of the plurality of NFC antennas has dimensions that are different from the dimensions of the other NFC antennas of the plurality of NFC antennas.

14. The method of claim 11, wherein the plurality of NFC antennas are co-planar.

15. The method of claim 11, wherein determining the relative strength and generating the position-correction information are performed by computational resources disposed on the tag emulator.

16. An NFC-enabled device, comprising:
an NFC antenna array having at least three antennas, each of the at least three antennas having a corresponding pair of antenna terminals and a corresponding shunt regulator;
a plurality of field strength detector circuits, each one of the plurality of field strength detector circuits coupled to a corresponding one of the at the least three antennas, and each one of the plurality of field strength detector circuits configured to measure an averaged DC current when the shunt regulator coupled to its corresponding antenna is operating, and further configured to measure a peak-to-peak voltage across the antenna terminals when the peak-to-peak voltage is less than a threshold voltage of the shunt regulator;
a computational resource coupled to each of the plurality of field strength detector circuits, the computational resource configured, based at least in part on the signals indicative of the strength of the received signal at each antenna of the NFC antenna array, to determine whether the NFC-enabled device should be repositioned for improved communicative interaction with a reader device; and
a visual display device coupled to the computational resource;
wherein the visual display, under control of the computational resource, provides a user-perceivable output indicating the distance and direction for repositioning the NFC-enabled device.

17. The NFC-enabled device of claim 16, wherein the at least three antennas are coplanar with each other.

18. The NFC-enabled device of claim 16, wherein each of the at least three antennas nominally have the same shape and dimensions.

19. The NFC-enabled device of claim 16, wherein each of the at least three antennas nominally comprise the same materials.

20. The NFC-enabled device of claim 18, wherein each of the at least three antennas is positioned symmetrically with respect to each other.

21. The method of claim 3, further comprising harvesting energy by the NFC-enabled device from an energization field.

22. The method of claim 15, further comprising harvesting energy by the NFC-enabled device from an energization field.

* * * * *